July 31, 1923.
W. D. LANKSTON
DUMP BODY VEHICLE
Filed Dec. 1, 1921
1,463,743
2 Sheets-Sheet 1
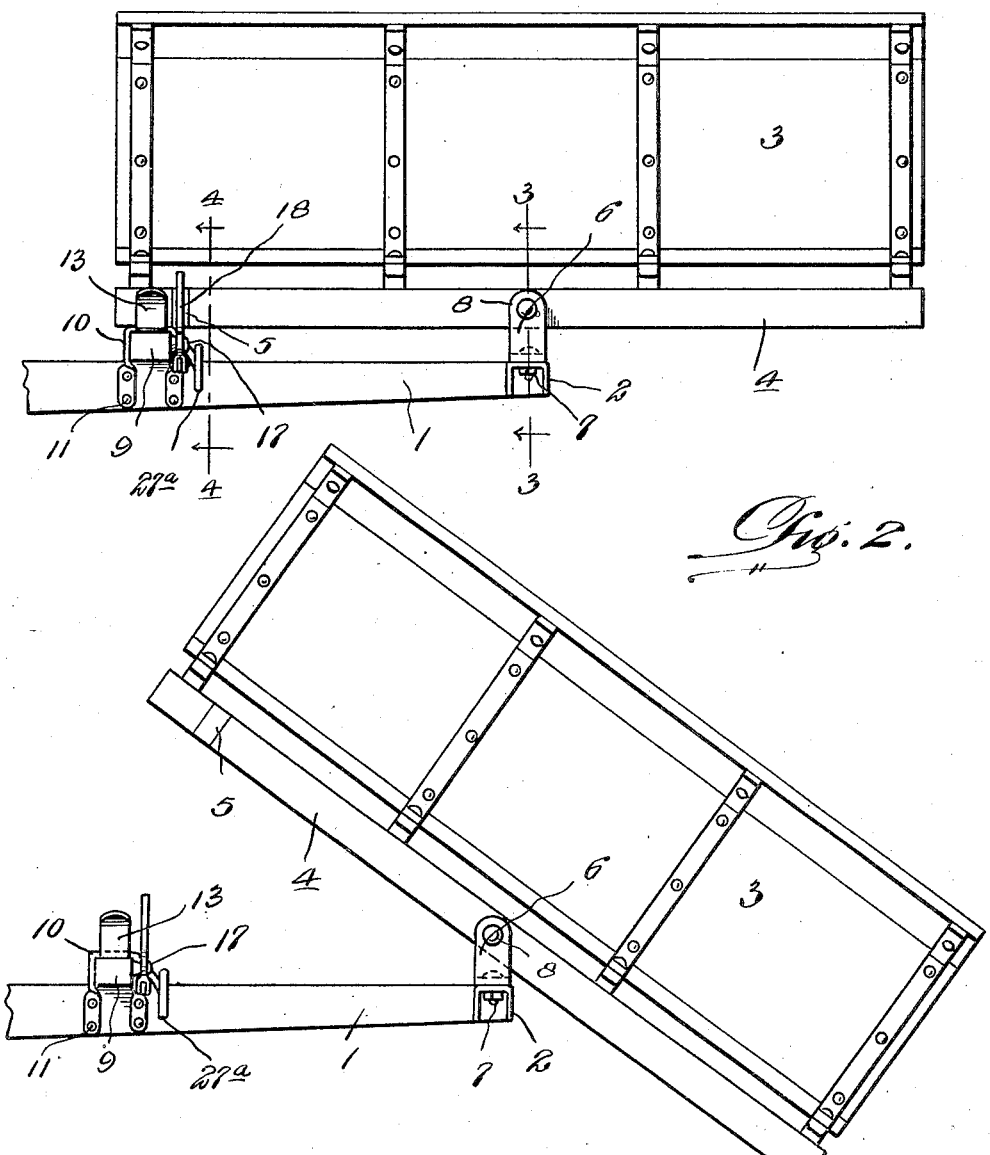

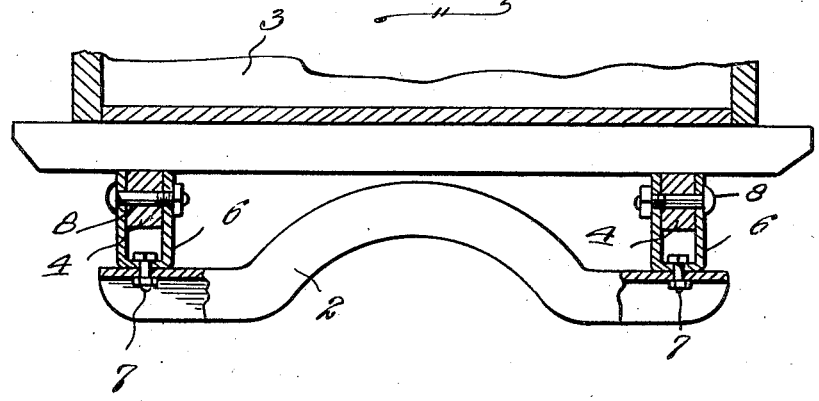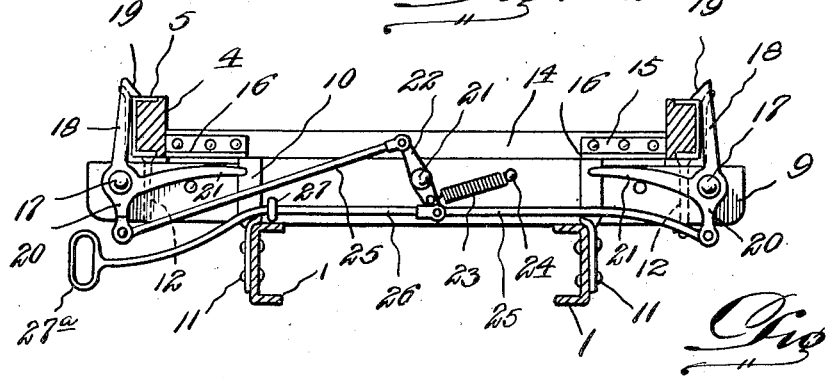

Patented July 31, 1923.

1,463,743

UNITED STATES PATENT OFFICE.

WALTER D. LANKSTON, OF ROBINSON, ILLINOIS.

DUMP-BODY VEHICLE.

Application filed December 1, 1921. Serial No. 519,190.

*To all whom it may concern:*

Be it known that I, WALTER D. LANKSTON, a citizen of the United States, residing at Robinson, in the county of Crawford and State of Illinois, have invented new and useful Improvements in Dump-Body Vehicles, of which the following is a specification.

The object of my said invention is the provision of a dump body vehicle, more particularly automobile, characterized by efficient means for automatically locking the dump-body when the same is restored to carrying position, and by efficient means through the medium of which an operator is enabled to unlock the body and then impart to the forward portion of the same an initial upward impulse with a view to causing the body to assume an inclined or dumping position.

The improvement is especially designed with the idea of its being readily applied to the chassis of an automobile truck such as at present in use without entailing change in the construction of the chassis.

To the attainment of the foregoing, the invention consists in the improvement as hereinafter described and definitely claimed.

In the accompanying drawings, forming part of this specification:—

Figure 1 is a side elevation illustrating my improvement with the dump-body locked or secured in carrying position.

Figure 2 is a similar view with the body in dumping position.

Figure 3 is a transverse section on an enlarged scale, taken in the plane indicated by the line 3—3 of Figure 1.

Figure 4 is an enlarged transverse section taken on the line 4—4 of Figure 1, looking forwardly.

Figure 5 is a view showing the body securing and initially moving means in plan.

Similar numerals of reference designate corresponding parts in all of the views of the drawings.

The longitudinal chassis bars 1 are preferably of the ordinary well known construction as is also the rear transverse chassis bar 2.

The body 3 is also by preference of ordinary construction, having longitudinal spaced bars 4 at its underside. As best shown in Figure 4 the said body bars 4 are provided at 5 with wear plates, it being understood in this connection that the body bars 4 are preferably of wood and that the plates 5 are employed to prevent undue wear of the wood. Manifestly when the body bars 4 are formed of metal, which is within the purview of my invention, wear plates or the like may be altogether omitted.

In furtherance of my invention U-shaped standards 6 are superimposed upon and are connected at 7 in appropriate manner to the rear chassis bar 2. The longitudinal bars 4 of the body 3 are disposed and movable in the said standards 6 being pivotally connected thereto by bolts 8.

Also in furtherance of my invention a transverse beam 9, preferably of hard wood is superimposed on the longitudinal chassis bars 1 and is permanently connected to the said bars 1 through the medium of stirrups 10 which straddle the bar 9 and are riveted or otherwise connected to the bars 1, as indicated by 11. Connected by upright bolts 12 which extend through the bar 9 and are appropriately secured thereto are guide members 13. The said guide members 13 have horizontal portions superimposed on the bar 9 and also have upstanding portions which are flared outwardly at their upper ends as illustrated. As their name imports the said guide members 13 are designed and adapted when the body 3 is swung from the position shown in Figure 2 to that shown in Figure 1 to assure the said body 3 assuming the proper position relative to the locking or securing means hereinafter described.

Interposed between and fixed to the longitudinal bars 4 of the body 3 is a transverse bar 14 on which are fixed angle plates 15, the horizontal portions 16 of which are for cooperation with the means for imparting an initial upward impulse to the forward portion of the body 3 subsequently to the unlocking of the said forward portion as hereinafter set forth.

Pivotally connected at 17 to the transverse bar 9 are compound body-locking or securing and moving members. Each of the said members has a latch arm 18 with a beveled head 19, a pendent arm 20, and an inwardly directed arm 21, the latter arm being for cooperation with the horizontal portion 16 of the adjacent angle plate 15 on the body 3.

Fulcrumed at 21 on the transverse bar 9 is a lever 22, one arm of which is connected to a retractile spring 23, connected at its opposite end to the bar 9 as indicated by 24. The arms of the said lever 22 are connected through rods 25 with the pendent arms 20 of the members before alluded to. Also connected to the lower arm of the lever 22 is a handle rod 26 which extends through an appropriate guide 27 on the bar 9 and terminates at its outer end in an appropriate hand grasp 27ª, located at one side of the vehicle as clearly indicated in Figures 4 and 5.

It will be readily apparent from the foregoing that my improvement is readily applicable to the chassis of an ordinary automobile truck; also, that when the body 3 of the improvement is in carrying position it is strongly locked or secured in said position by the cooperation of the arms 18 of the swinging members with the body bars 4 as shown in Figures 1, 4 and 5. It will further be apparent that when it is desired to dump the body 3 it is simply necessary for the operator to pull outwardly on the handle rod 26 when the swinging members will first be rocked to carry the arms 18 out of engagement with the body bars 4 so as to release said bars, and then to thrust the arms 21 against the plates 15 to impart to the forward portion of the body an initial upward movement and thereby assure prompt dumping thereof. After the body 3 is dumped and it is desired to restore the same to and secure it in carrying position, it is simply necessary for the operator to raise the rear end of the body 3 when the forward portion thereof will be automatically engaged and secured by the arms 18 of the swinging members, the spring 23 tending to yieldingly move the arms 18 inwardly.

I have entered into a detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claims.

Having described my invention, what I claim and desire to secure by Letters Patent, is:—

1. In a vehicle, the combination of longitudinal chassis bars, a rear frame bar carried by said chassis bars, a dump body having longitudinal parallel bottom bars hingedly connected at intermediate points of their length to said rear frame bar, a transverse beam superimposed on and fixed to the longitudinal chassis bars and spaced in front of the rear frame bar, and manually-operable means carried by the said transverse beam and constructed and arranged when the body is restored to carrying position to automatically and detachably engage the longitudinal bottom bars of the body and secure the body in carrying position, and also constructed and arranged to impart an upward impulse to the forward portion of the body after the release thereof.

2. In a vehicle, the combination of a frame including longitudinal chassis bars, a dump body having longitudinal bars pivotally mounted on said frame, a transverse beam fixed on the longitudinal chassis bars and spaced in front of the pivotal connection of the body, compound body locking and moving members pivoted to the side of the transverse beam and having upstanding latch arms with beveled heads, pendent arms and inwardly directed arms, the latter to move the forward portion of the body upwardly after the disengagement of the latch arms from the longitudinal bars of the body, a lever arranged between the body locking and moving members and pivoted at an intermediate point of its length on the said beam, rods interposed between and connecting the ends of the said lever and the pendent arms of the body locking and moving members, a handle rod connected to the said lever and movable in a guide on the transverse beam and carried by said beam, and a retractile spring interposed between and connected to one arm of the said lever and the transverse beam.

In testimony whereof I affix my signature.

WALTER D. LANKSTON.